(12) United States Patent
Hikmet et al.

(10) Patent No.: US 7,362,505 B2
(45) Date of Patent: Apr. 22, 2008

(54) MIRROR WITH BUILT-IN DISPLAY

(75) Inventors: Rifat Ata Mustafa Hikmet, Eindhoven (NL); Jan Baptist Adrianus Maria Horsten, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 10/579,932

(22) PCT Filed: Nov. 16, 2004

(86) PCT No.: PCT/IB2004/052451

§ 371 (c)(1),
(2), (4) Date: May 19, 2006

(87) PCT Pub. No.: WO2005/050267

PCT Pub. Date: Jun. 2, 2005

(65) Prior Publication Data

US 2007/0064321 A1    Mar. 22, 2007

(30) Foreign Application Priority Data

Nov. 24, 2003  (EP) ................... 03104332

(51) Int. Cl.
*G02F 1/00*  (2006.01)

(52) U.S. Cl. .................. 359/501; 359/485; 349/96

(58) Field of Classification Search ............ None
See application file for complete search history.

(56) References Cited

FOREIGN PATENT DOCUMENTS

WO    WO 9838547 A1 * 9/1998

* cited by examiner

*Primary Examiner*—Stephone B. Allen
*Assistant Examiner*—Derek S. Chapel

(57) ABSTRACT

A mirror display device which may be simultaneously used for display purposes, based on a display, wherein the display device during use provides light of a first (circular) polarization, with a switchable polarizing mirror placed in front of it. The reflectivity of such a mirror display device may be enhanced by providing a second switchable (circular) polarizer between the display device and the polarizing mirror.

15 Claims, 3 Drawing Sheets

MIRROR WITH BUILT-IN DISPLAY

The invention relates to a polarizing mirror for viewing purposes having a first plane reflecting light of a first kind of polarization to a viewing side, the mirror passing light of a second kind of polarization and being provided with a display device at its non-viewing side, which display device during use provides light of the second kind of polarization, the polarizing mirror being switchable between a state passing light of the second kind of polarization and reflecting light of the first kind of polarization and a state passing light of both kinds of polarization.

A "mirror for viewing purposes" or "display mirror" in this application refers to a mirror, via which a person's eye (or an artificial eye like a (infra-red) camera lens) sees a reflected part of the outside world. As examples one may think of large mirrors, like bathroom mirrors, full-length mirrors in fitting rooms or even mirrored walls. Other examples are medium sized mirrors, like outside mirrors for trucks or dressing-table mirrors.

By "having a first plane reflecting light of a first kind of polarization" it is meant that a mirror plane acts as a polarizing plane. When in use, light within a certain range of a wavelength of light incident on a polarizing plane will be divided in two components one which is reflected by the polarizing plane and one of which passes through the polarizing plane. Generally most known is the division of light in two components having linearly polarized, perpendicular directions of polarization. In this particular application light is generally supposed to be divided in right-handed and left-handed circular polarization but the invention is equally applicable to light being divided in linearly polarized, perpendicular directions of polarization.

The displays in examples based on circular polarization are supposed to provide light of the second kind of circular polarization, which does not exclude displays, which do emit or provide (e.g. an LCD having a backlight) linearly or non-polarized light. Linearly polarized light as generally provided by LCDs may be converted into circularly polarized light by means of a quarter lambda plate, while non-polarized as generally provided by e.g. (O)LED-displays or plasma displays may be converted into circularly polarized light by means of a ½ lambda plate (retarder).

A display mirror of the kind mentioned above is described in the pending European Applications Serial number 02076069.2, filed on Mar. 18, 2002 and Serial number 02079306.3, filed on Oct. 17, 2002 (=PH NL 02.1038). The mirror function is obtained by introducing a polarizing mirror or reflective polarizer instead of a partly reflecting layer in front of a display device.

Although theoretically, in the display mode a full suppression of reflected light can be achieved with the present concepts while in the mirror mode full reflection of incident light is possible this is not achieved in practice. A wider range of possible embodiments is shown in the pending European Applications to select an optimal combination. A specific issue is that in the embodiments shown are based on industrially available polarizing mirrors (laminated retarder foils) in which the smoothness of the mirror surface is not guaranteed. Moreover the reflection in the embodiments is not optimal.

The present invention has as one of its goals to overcome these problems at least partially.

To this end a polarizing mirror according to the invention has at its non-viewing side between the display device and the polarizing mirror a switchable polarizer The switchable polarizer may be switchable between a state passing light of the first kind of polarization and reflecting light of the second kind of polarization and a state passing light of both kinds of polarization. It may on the other hand be switchable between a state passing light of the second kind of polarization and a state reflecting light of the first kind of polarization and a state passing light of both kinds of polarization. In the latter case a retarding layer is provided between the polarizing mirror and the switchable polarizer changing the kind of polarization from the first kind into the second kind or vice versa. The combination of the switchable polarizing mirror and the switchable polarizer guarantees a high reflection in the mirror state.

Preferably the polarizing mirror and switchable polarizers are cholesteric polarizers.

These and other aspects of the invention are apparent from and will be elucidated with reference to the embodiments described hereinafter.

In the drawings:

FIG. 1 is a possible embodiment of a mirror device according to the invention, while

FIGS. 4a, 4b are diagrammatic cross-sections of a part of another mirror device according to the invention, while

The Figures are diagrammatic and not drawn to scale. Corresponding elements are generally denoted by the same reference numerals.

Figure 1:
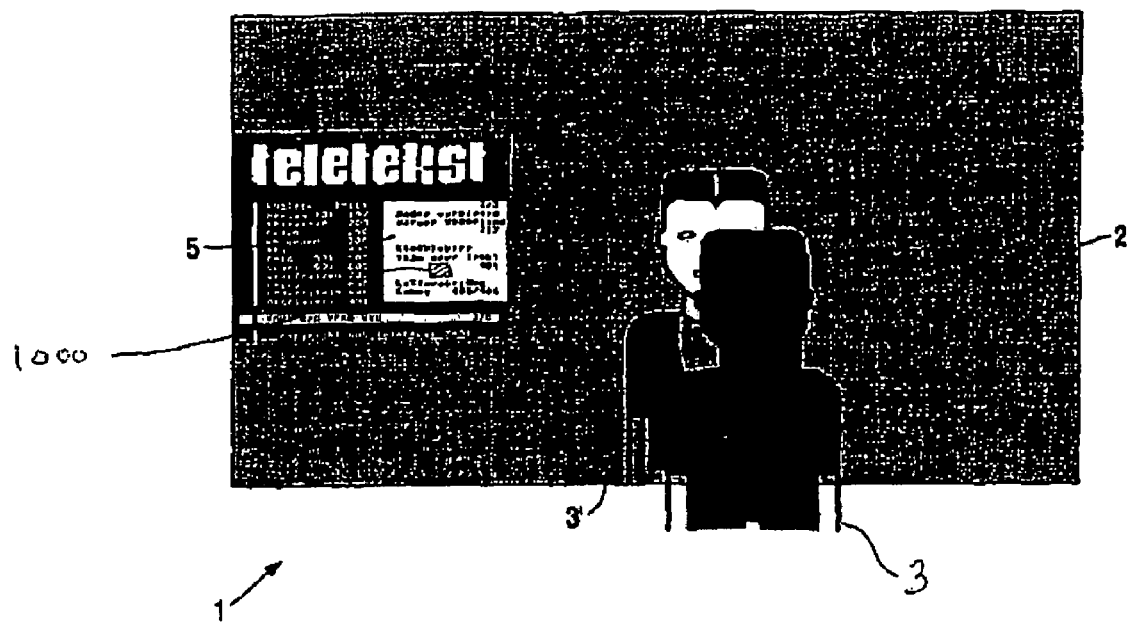
Figure 2:
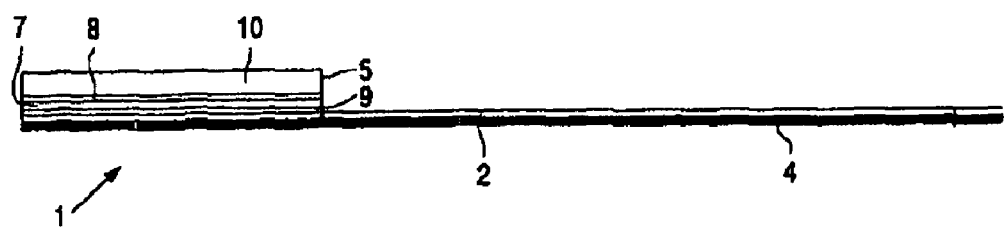
FIG. 2 is a diagrammatic cross-section of a part of such a mirror device.

FIG. 1 shows a mirror device 1 for viewing purposes having on a glass plate or any other substrate 4 a mirror 2, in this example a cholesteric mirror, reflecting light, so a person 3 sees his image 3' (and further background, not shown). According to the invention the mirror (plane) in one state only reflects light of a first kind of polarization (twist, e.g. right-handed), but passes light of a second kind of polarization (the opposite twist, left-handed). Furthermore the mirror is provided with a display device 5 at its non-viewing side (see also FIG. 2).

The display device 5 in this example is a liquid crystal display device having between two substrates (glass or plastic or any other suitable material) a liquid crystal material 7. Since most liquid crystal display devices are based on polarization effects the display 5 during use substantially emits polarized light. In general light from a backlight 10 is modulated by the liquid crystal display effect. Since the liquid crystal display device is based on a polarization effect the display device 5 comprises a first polarizer 8 and a second polarizer (or analyzer) 9, which passes light of a certain polarization (twist).

If this light of a certain polarization twist has the same polarization twist as the second kind of polarization, it passes the mirror (plane) 2 without any loss of light (100% transmission).

Since most liquid crystal display devices are based on modulation of linearly polarized light, usually linear polarizers 8, 9 are used. Since the mirror 2 is base on a circular polarization effect light from the display is given a circular polarization by means of a (not shown) quarter lambda plate.

On the other hand in certain applications it may even be attractive to polarize light from e.g. an (O)LED or other display to obtain the effect of a high contrast of displayed information with respect to reflected images in mirror applications.

Figures 3A, 3B:
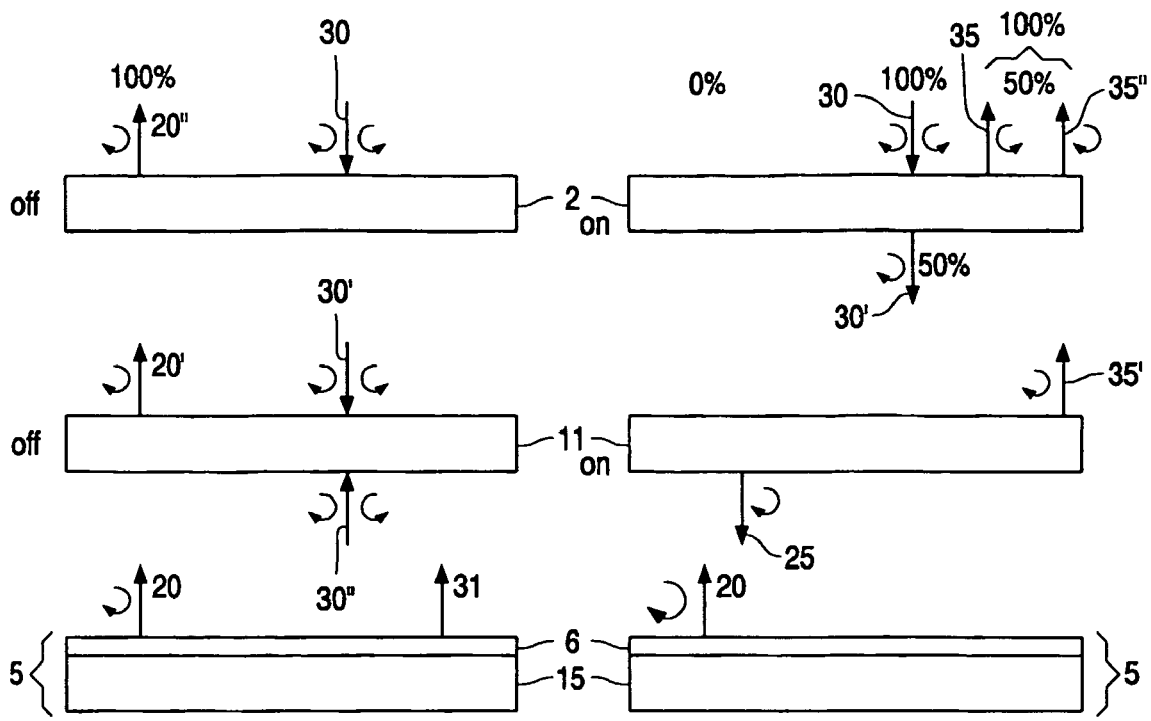
FIGS. 3a, 3b are diagrammatic cross-sections of a part of a mirror device according to the invention.

FIG. 3a, 3b show a part of a mirror display device according to the invention in which the mirror 2 is switchable between a state passing light of the second kind of polarization and reflecting light of the first kind of polarization (FIG. 3b) and a state passing light of both kinds of polarization (FIG. 3a). In this example the mirror 2 is a switchable cholesteric polarizer.

According to the invention a second switchable (cholesteric) polarizer 11 is provided between the display device 5 and the polarizing mirror 2, which switchable polarizer 11 is switchable between a state passing light of the first kind of polarization and reflecting light of the second kind of polarization and a state passing light of both kinds of polarization. As the display device 5 a liquid crystal display device 15 is used, comprising a further quarter lambda plate 6. Since most liquid crystal display devices are based on modulation of linearly polarized light, light from the display is given a circular polarization by means of a (not shown) quarter lambda plate. In this case (FIG. 3a, showing the display-mode) the display device 5 emits light of the second kind of polarization (circularly (left-handed) polarized light, arrow 20). Since both the switchable (cholesteric) polarizer 11 and the polarizing mirror 2 are in a state passing light of both kinds of polarization (off-state), this circularly (left-handed) polarized light passes both the polarizer 11 and the polarizing mirror 2 (arrows 20', 20"), leading to a transmission of (theoretically) 100%. For the same reason incident light 30 passes both the polarizing mirror 2 and the polarizer 11 (arrows 30', 30"), after which it is absorbed in the display device 5, although some (non-) polarized light 31 (or any other spurious light) may be reflected in this display-mode.

In the mirror-mode (FIG. 3b) the display device 5 emits light of the second kind of polarization (circularly (left-handed) polarized light, arrow 20), while the switchable (cholesteric) polarizer 11 reflects of the second kind of polarization (arrow 20'), which is absorbed again in the display device 5.

The polarizing mirror 2 now partly (50%) reflects (one polarization twist (right-handed), in this example indicated by arrow 35) of the incident light (arrow 30) and passes circularly (left-handed) polarized light (arrow 30', the remaining 50%). The switchable (cholesteric) polarizer 11 reflects said (left-handed) polarized light again, while the polarizing mirror 2 passes said light (arrows 35', 35"), leading to a reflection of (theoretically) 100%.

In the example of FIG. 3 both the polarizing mirror 2 and polarizer 11 are switched off. In this case there is no mirror and the display can be observed without a reflection superimposed on it. If only the cholesteric mirror 2 is activated and becomes transparent all the light originating from the LCD becomes transmitted while half of the ambient light becomes reflected. In this mode the display can be used as a half mirror.

Figures 4A, 4B:
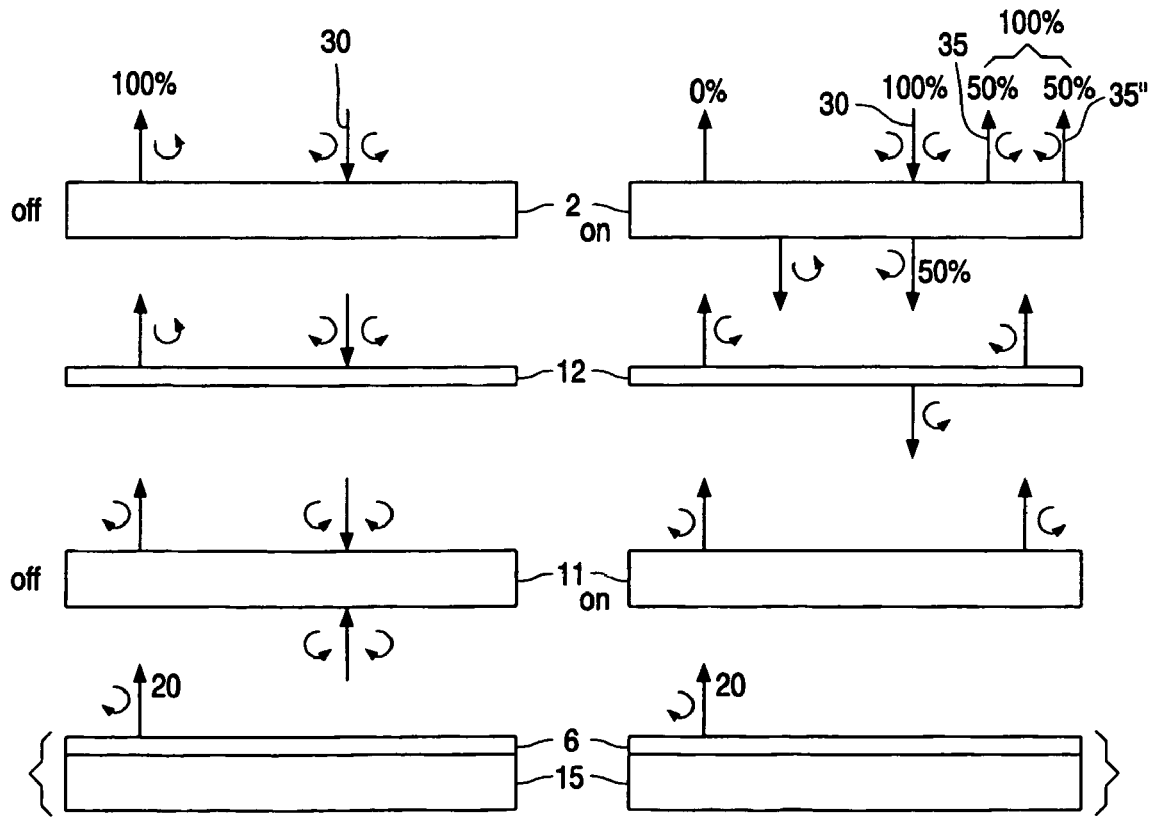

In the example of FIG. 3, switchable cholesteric mirror 2 is shown in combination with a switchable cholesteric polarizer of the opposite sense (reflecting respectively left-handed and right-handed polarized light). FIGS. 4a, 4b in a similar way show a device having a similar switchable cholesteric mirror 2 but this time in combination with switchable cholesteric polarizer of the same sense (both are reflecting left-handed (or right-handed) polarized light). The same effect as described with respect to FIG. 3 can now be obtained by introducing a ½ lambda retarder 12 between the cholesteric mirror 2 and the switchable cholesteric polarizer 11. The ½ lambda retarder 12 may be a broadband retarder but preferably is centered around wave-lengths of 570 nm. A partial display 1000 emitting non-polarized light having at the emitting side a ½ lambda foil, lambda having a value 500-600 nm. As a result, substantially all incident light in principle is reflected in the display mode. Also the effects of spurious light are diminished. Light passing the cholesteric polarizers described above may become elliptically polarized at larger angles of incidence. In order to compensate for the elliptical polarization, extra retarders can be used with a negative birefringence within the system. Such a retarder can be placed for example underneath the ½ lambda retarder of FIGS. 4a, 4b when cholesteric polarizers of the same sense is used. When the cholesteric polarizers have the same sense, only a retarder with a negative birefringence is used without the need for ½ lambda retarder.

Figure 5:
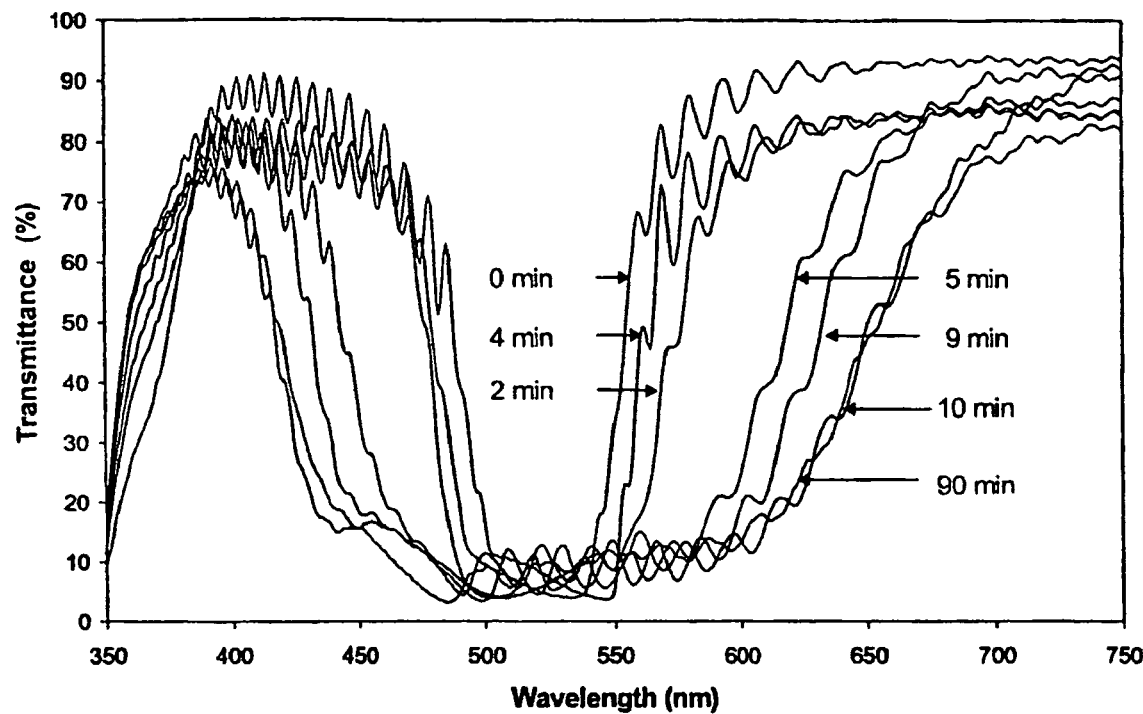
FIG. 5 shows the bandwidth of the cholesteric mirror as function of time during manufacture and FIG. 6 shows the temperature dependency of the bandwidth of such a cholesteric mirror.

A switchable cholesteric polarizer (mirror) 2, 11 can be produced by polymerizing mono and diacrylates in the presence of non-reactive LC molecules in the chiral nematic phase. During polymerization, some of the mixtures show the tendency of phase separation. This tendency could be influenced by various parameters. For example, factors determining the kinetic chain length such as the initiator concentration and the UV intensity had a profound influence on the width of the reflection band. As known with increasing molecular weight of the polymer, its miscibility with a monomer decreases. In the gels during polymerization, such a phase separation leads to concentration fluctuations. These fluctuations are fixed by the presence of the cross-links and the system further remains kinetically stable. As a function of time and temperature, no homogenization or change in the structure of the network is observed. Such a phase separation has also been observed for gels containing only diacrylate molecules. It was also found that when compounds, referred to as excited state quenchers, were added to the monomeric mixtures further increase in the bandwidth of the cholesteric mirror can be obtained. The change in the bandwidth of the cholesteric mirror as function of time for a system containing excited state quencher is shown in FIG. 5. It can be seen that after a certain time the width of the band starts increasing before reaching a certain value where after it remains the same.

Figure 6:
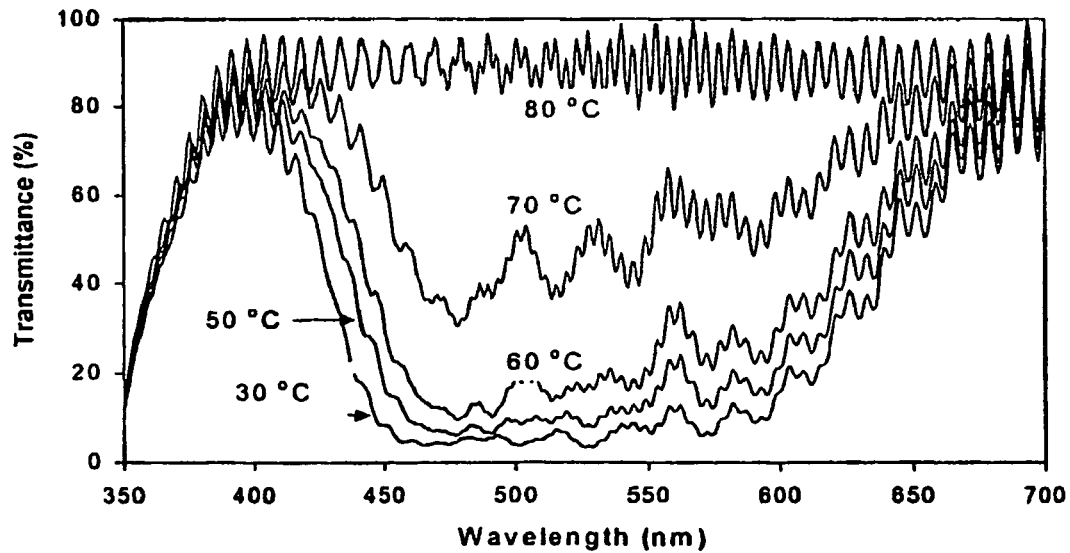

The temperature dependency of the bandwidth of the cholesteric mirror is shown in FIG. 6. With increasing temperature the position of the reflection band remains almost constant and only a slight decrease can be observed in the width of the reflection band. These broad band cholesteric gels could be switched reversibly between silver colored reflecting and non-reflecting transparent states. Upon application of the electric field, the cholesteric structure disappears and the cell becomes transparent. Upon removal of the voltage, the cell reverts to the silver colored reflecting state very rapidly.

The protective scope of the invention is not limited to the embodiments described. For instance, since the mirror 2 has a polarizing effect the second polarizer (or analyzer) 9 in FIG. 2 may be deleted, if wanted.

Although a backlit transmissive liquid crystal display device has been described, the use of reflective liquid crystal display devices is not excluded.

On the other hand as shown light from e.g. an (O)LED, a plasma displays or electrophoretic display may be polarized or it may even be attractive to use other display effects to obtain the effect of a high contrast of displayed information with respect to reflected images in mirror applications.

Also more than one display 5 can be integrated in the mirror, whereas many other applications areas can be thought of (rear view mirrors, fitting rooms, etcetera). In some applications, if a matrix form is used, with adequate driving circuitry the switching between mirror-state and display state can be done locally.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A polarizing mirror for viewing purposes having a first plane reflecting light of a first kind of polarization to a viewing side, the polarizing mirror passing light of a second kind of polarization and being provided with a display device at its non-viewing side, which display device during use provides light of the second kind of polarization, the polarizing mirror being switchable between a state passing light of the second kind of polarization and reflecting light of the first kind of polarization and a state passing light of both kinds of polarizing, wherein a switchable polarizer is located between the polarizing mirror and a ¼λ foil.

2. The polarizing mirror as claimed in claim 1, wherein the switchable polarizer is switchable between a state passing light of the first kind of polarization and reflecting light of the second kind of polarization and a state passing light of both kinds of polarization.

3. The polarizing mirror as claimed in claim 1, wherein the switchable polarizer is switchable between a state passing light of the second kind of polarization and reflecting light of the first kind of polarization and a state passing light of both kinds of polarization, the polarizing mirror comprising a retarding layer being provided between the polarizing mirror and the switchable polarizer, wherein the retarding layer is configured to change the polarization of light from the first kind of polarization into the second kind of polarization or change the polarization of light from the second kind of polarization into the first kind of polarization.

4. The polarizing mirror as claimed in claim 3, the retarding layer comprising a ½λ foil, λ having a value of 500-600 nm.

5. The polarizing mirror as claimed in claim 4, the retarding layer having a double layer comprising a retarder with a negative birefringence.

6. The polarizing mirror as claimed in claim 1, the polarizing mirror and switchable polarizers being cholesteric polarizers.

7. The polarizing mirror as claimed in claim 6, the display device comprising a partial display emitting polarized light having at the emitting side, the ¼λ foil, λ having a value of 500-600 nm.

8. The polarizing mirror as claimed in claim 6, the display device comprising a partial display emitting non-polarized light having at the emitting side, a ½λ foil, λ having a value of 500-600 nm.

9. The polarizing mirror as claimed in claim 1 having a bandwidth of at least 50 nm.

10. The polarizing mirror as claimed in claim 1 reflecting in the visible range of the spectrum.

11. The polarizing mirror as claimed in claim 1, further comprising an LCD device positioned next to the ¼λ foil.

12. A polarizing mirror for viewing purposes having a first plane reflecting light of a first kind of polarization to a viewing side, the polarizing mirror passing light of a second kind of polarization and being provided with a display device at its non-viewing side, which display device during use provides light of the second kind of polarization, the polarizing mirror being switchable between a state passing light of the second kind of polarization and reflecting light of the first kind of polarization and a state passing light of both kinds of polarization, the polarizing mirror having at the non-viewing side, a switchable polarizer between the display device and the polarizing mirror, wherein the switchable polarizer is positioned between a ¼λ foil and a ½λ foil.

13. The polarizing mirror as claimed in claim 1, wherein an area of the display unit is smaller than an area of the first plane.

14. The polarizing mirror as claimed in claim 1, wherein the polarizing mirror is switchable between a state passing light of the second kind of polarization and reflecting light of the first kind of polarization and a state passing light of both kinds of polarization, and the polarizing mirror is immediately next to the switchable polarizer.

15. The polarizing mirror as claimed in claim 1, wherein λ has a value of 500-600 nm.

* * * * *